United States Patent
Arrington et al.

[11] Patent Number: 5,529,737
[45] Date of Patent: Jun. 25, 1996

[54] PROCESS FOR MAKING CELLULOSE TRIACETATE PHOTOGRAPHIC FILM BASE

[75] Inventors: Eric E. Arrington, Farmington; Randall J. Kehl, Churchville, both of N.Y.

[73] Assignee: Eastman Kodak Company, Rochester, N.Y.

[21] Appl. No.: 308,011

[22] Filed: Sep. 16, 1994

[51] Int. Cl.⁶ .............................. B29D 7/01; B29C 41/26
[52] U.S. Cl. ............................................. 264/207; 264/217
[58] Field of Search ........................... 264/216, 217, 264/207; 106/196

[56] References Cited

U.S. PATENT DOCUMENTS

| | | |
|---|---|---|
| 1,963,765 | 4/1928 | Stevens et al. . |
| 2,369,484 | 2/1945 | Nadeau . |
| 2,492,977 | 1/1950 | Fordyce et al. . |
| 2,644,195 | 7/1953 | Bennes et al. ........................... 264/217 |
| 2,892,725 | 6/1959 | Rosenthal . |
| 2,982,598 | 5/1961 | Downing . |
| 3,032,817 | 5/1962 | Czerkas . |
| 3,454,349 | 7/1969 | Smart . |
| 3,952,081 | 4/1976 | Epstein et al. ........................... 264/207 |
| 5,152,947 | 10/1992 | Takeda et al. . |
| 5,188,788 | 2/1993 | Suzuki et al. . |
| 5,314,647 | 5/1994 | Rieth ........................................ 264/217 |

FOREIGN PATENT DOCUMENTS 310540  7/1930  United Kingdom .

Primary Examiner—Mathieu D. Vargot
Attorney, Agent, or Firm—Robert A. Gerlach

[57] ABSTRACT

A method of making a cellulose triacetate photographic film base which includes delivering a dope solution of from 15 to 35 wt % of cellulose triacetate in dichloromethane based on the total weight of the solution under a pressure of from 7 atmospheres to 50 atmospheres and a temperature of from 41° C. to 63° C. to a surface maintained at atmospheric pressure; the surface being maintained at a temperature below the boiling point of dichloromethane.

9 Claims, 1 Drawing Sheet

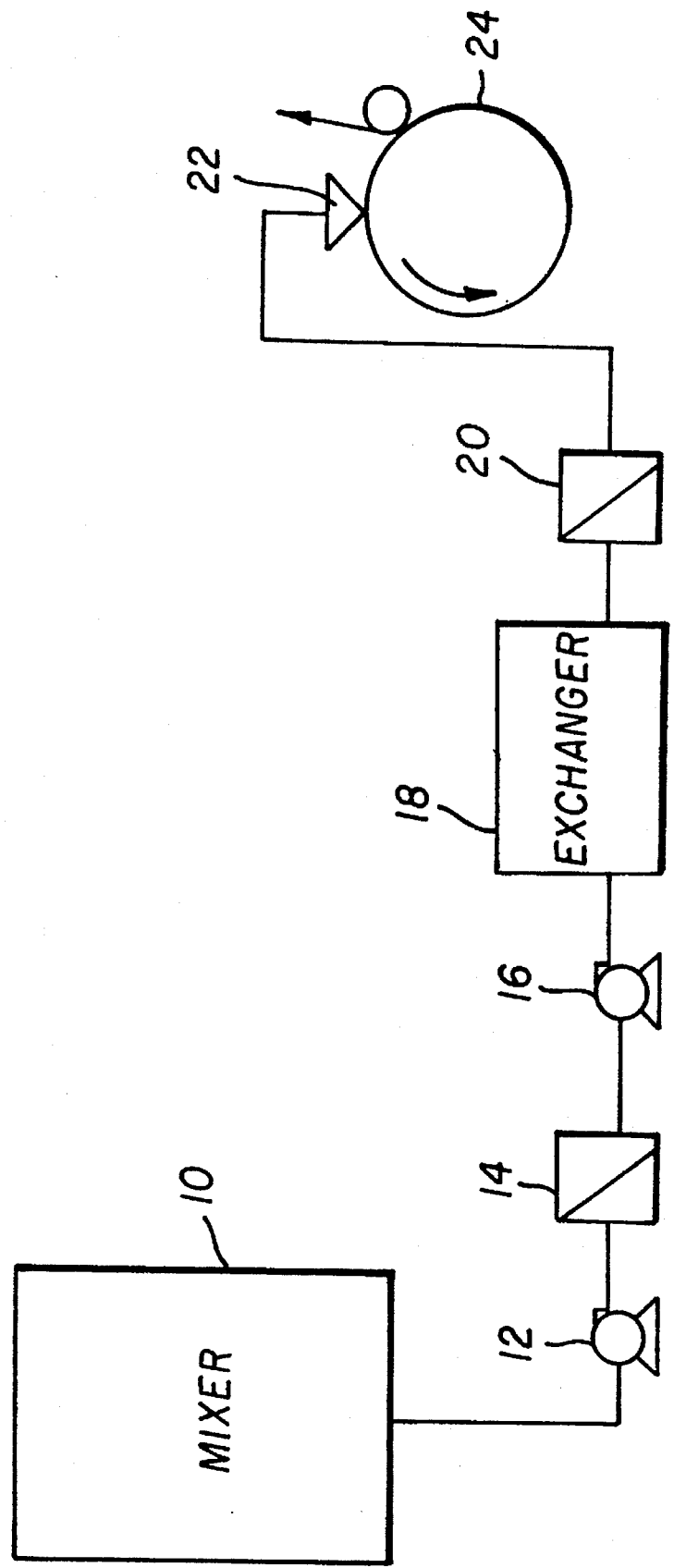

PROCESS FOR MAKING CELLULOSE TRIACETATE PHOTOGRAPHIC FILM BASE

BACKGROUND OF THE INVENTION

Field of the Invention

This invention relates to a process for producing cellulose triacetate photographic film base by solution casting and more particularly to a process for producing cellulose triacetate film base at increased speed and with improved clarity.

The preparation of cellulose ester film and particularly cellulose triacetate film includes the steps of forming a dope solution by dissolving cellulose triacetate in a suitable solvent such as dichloromethane. The dope has a concentration of cellulose triacetate in the solvent of from about 15 to about 35 percent by weight. The dope is filtered through one or more filtration devices to remove solid or gelatinous particles from the dope which will cause imperfections if permitted to remain in the dope during subsequent steps in the procedure. The dope is then extruded through a hopper from which it is cast onto a highly polished wheel or continuous band where the dope is "cured" by evaporation of the solvents. Finally, the cured dope is stripped from the wheel or band, dried further and wound as a film.

The rate at which cellulose triacetate film can be prepared is dependent upon the concentration of the cellulose triacetate in the dope solution and the related property of viscosity. These two characteristics, coupled with the temperature of the dope and the pressure requirements of filtration units and other apparatus in the system, control the rate at which the cellulose triacetate film can be prepared. The pressure requirements of the filter presses is a characteristic of the device which cannot be exceeded because of safety reasons. Further, as the particular filters, and especially the filters for fine particles become clogged for any reason either due to the viscosity of the dope or because of the high concentration of the dope, the flow rate (throughput) must be decreased in order to remain within the safety tolerances of the device. This also is true should finer filter mesh size be employed in the filtering devices to bring about even a higher degree of homogeneity in the dope. Thus, the rate of flow through the filtering devices can only be increased or maintained by raising the inlet pressure of the dope and this is not prudent or practical because of safety reasons. Thus, both alternatives result in decreased production capacity. Finally, an increase in dope concentration which may be desired to decrease the drying load on the wheel or continuous band, results in an increase in the dope viscosity and again an increase in the pressure within the filter housing to achieve the same flow rate through the filter. Thus, the maximum pressure rating of the filter device limits capacity by limiting the rate of flow due to buildup on the filter media, filter media size, and dope concentration. Further, as the pressure drop across the filter media increases either because of obstruction of the media or decreased opening size of the media, more frequent shut-down is required, thus further decreasing capacity.

As a result, there is a need for a process for producing cellulose triacetate film at higher capacities utilizing dope solutions of higher concentration without impairing the clarity of the film.

SUMMARY OF THE INVENTION

The invention provides a method of making a cellulose triacetate photographic film base by delivering a solution from about 15 to 35 weight percent of cellulose triacetate in dichloromethane based upon the total weight of the solution at a pressure of from about 7 atmospheres to about 50 atmospheres and a temperature of from about 41° C. to about 63° C. to a surface maintained at atmospheric pressure at a temperature below about 40° C.

The present invention achieves an increase in the rate of production of cellular triacetate film by decreasing the viscosity of the dope, thus reducing the pressure drop across the filter while allowing either finer filtration of the dope or increased capacity at constant filtration or more concentrated dope at constant filtration. These advantages result without either bubbling of the dope when deposited onto the wheel or continuous band surface or a decrease in the clarity of the resulting film base.

BRIEF DESCRIPTION OF THE DRAWING

The FIGURE is a flow diagram of suitable apparatus for carrying out the process in accordance with the invention.

DESCRIPTION OF PREFERRED EMBODIMENTS

In the preparation of cellulose triacetate photographic film base in accordance with this invention, a concentrated dope solution is first prepared by mixing and dissolving cellulose triacetate in a dichloromethane solvent to which may be added other ingredients such as alcohols including ethanol, butanol, propanol, methanol, mixtures thereof, and the like, ketones including acetone, methylethyl ketones, and the like. The cellulose triacetate is present in the dope solution in an amount of from about 15 to 35 percent by weight based on the total weight of the solution. This dope solution is pumped under pressure through a heater where it is heated to a temperature of from about 41° C. to about 63° C. and then through a fine filter where particles and slugs of gelatinous material are removed. The filtered material still under the indicated pressure and within the temperature range indicated is cast onto a highly polished wheel or continuous belt or band surface maintained at ambient conditions and once the structural integrity of the film is sufficient, it is removed from the surface and dried in accordance with the conventional techniques known in the art of preparing cellulose triacetate photographic film base. In a preferred method, the concentration of the cellulose triacetate in the dope solution is established at a value of from 20 to 35 percent by weight based on the weight of the entire solution. Further, a mixture of solvents of dichloromethane, and methanol wherein the dichloromethane is present in the mixture in an amount of at least 80 percent by weight based on the weight of the solvents is preferred. Most preferred is a solvent mixture containing from about 80 to 95 percent dichloromethane with a remainder being a mixture of methanol and butanol.

It is preferred that the pressure of the solution as it is passing through the heat exchanger and the filtering device be maintained under a pressure preferably of from about 10 to 45 atmospheres and most preferably from about 15 to about 40 atmospheres. The temperature of the dope solution prior to being cast upon the highly polished surface is preferably within the range of from 45° C. to 60° C. and most preferably at a temperature of from about 47° C. to 55° C.

Referring specifically to the FIGURE, the dope is prepared in the mixer 10 by dissolving cellulose triacetate in the solvent dichloromethane or mixture of dichloromethane with other ingredients. From the mixer 10, it is pumped by pump 12 through a coarse filter 14 and then pumped again by pump 16 through a heat exchanger 18 wherein the pressure is within the range of 7 to 50 atmospheres and the temperature of the dope is raised to 41° C. to 63° C. The dope is next filtered through fine filter 20 to remove any gelatinous particles or other matter. The fine filter generally has openings of approximately 30 micrometers.

Finally, the dope still under the pressure indicated above and within the temperature range indicated above, is cast by means of a conventional die 22, including coat hanger dies 22, horseshoe dies, and the like onto the polished wheel 24 under ambient conditions.

While the flow diagram as shown in the FIGURE includes pump 12 and coarse filter 14, which are preferred, it should be understood that they are not required to practice the method of this invention.

The invention will be further illustrated by the following examples:

Example 1

A 20 to 35 percent by weight solution of cellulose triacetate in dichloromethane-methanol-butanol (90/5/5) is stirred at ambient temperature in a mixer and pumped out of the mixer through a coarse filter, the media having openings of 30 μm and then pumped at a pressure of 41 atmospheres to a heat exchanger where the temperature is raised to about 52° C. The pressure drop across the heat exchanger is 16 atmospheres. Thus, the pressure at the inlet of the fine filter is 25 atmospheres. The solution is then passed through a fine 30 micrometer absolute depth media filter and exits at a pressure of 17 atmospheres. The solution is extruded out of a coat hanger die onto a wheel.

Example 2

(Comparison)

Example 1 is repeated except that the heat exchanger maintains the temperature of the solution at 29° C., in accordance with the conventional method of making cellulose triacetate film base. The pressure at the inlet to the fine filter is 37.5 atmospheres.

Comparing pressure at the inlet to the fine filter in Examples 1 and 2 (the dope in Example 1 being at a temperature above the atmospheric boiling point of dichloromethane), the inlet filter pressure can be reduced by 33 percent without adversely affecting the quality of the film.

Example 3

(Invention)

Example 2 is repeated except that the inlet solution concentration is one weight percent higher, the temperature is 35° C., and the pressure is 35 atmospheres.

Thus, a cellulose triacetate solution of higher concentration can be employed in accordance with the invention.

What is claimed is:

1. A method of making a cellulose triacetate photographic film base which comprises delivering a dope solution of from 15 to 35 wt % of cellulose triacetate in dichloromethane based on the total weight of the solution under a pressure of from 7 atmospheres to 50 atmospheres and a temperature of from 41° C. to 63° C. to a surface maintained at atmospheric pressure; the surface being maintained at a temperature below the boiling point of dichloromethane.

2. The method of claim 1 wherein the cellulose triacetate is present in the dichloromethane in an amount of from 20 to 35 percent by weight.

3. The method of claim 1 wherein the dope solution is delivered at a temperature of from 45° C. to 60° C.

4. The method of claim 1 wherein the dope solution is delivered at a pressure of from 10 to 45 atmospheres.

5. A method of making cellulose triacetate photographic film base which comprises forming a dope by dissolving from 15 to 35 percent by weight of cellulose triacetate in dichloromethane, heating the dope to a temperature of from 41° C. to 63° C. under a pressure of 7 to 50 atmospheres, filtering of the dope, extruding a film of the dope onto a continuously moving surface maintained at ambient conditions and separating the film from the surface.

6. The method of claim 5 wherein the temperature is maintained at from 45° C. to 60° C.

7. The method of claim 5 wherein the pressure is maintained at from 10 to 45 atmospheres.

8. The method of claim 5 wherein from 20 to 35 percent by weight of cellulose triacetate based on the weight of the dope is present.

9. In a method of making cellulose triacetate photographic film base including forming a dope of from 15 to 55 percent by weight of cellulose triacetate in dichloromethane, filtering the dope to remove solid agglomerates and extruding the dope through a slot die onto a continuous surface to form a film, the improvement which comprises conducting the filtering and extrusion steps at a temperature of from 41° C. to 63° C. and a pressure of 7 to 50 atmospheres, the continuous surface being maintained under ambient conditions.

\* \* \* \* \*